United States Patent [19]

Stephenson et al.

[11] 3,901,461
[45] Aug. 26, 1975

[54] VEHICLE SENSITIVE RETRACTOR WITH IMPROVED UNIVERSAL INERTIA MECHANISM

[75] Inventors: Robert L. Stephenson, Sterling Heights; Robert C. Pfeiffer, Rochester; Yogendra Singh Loomba, Washington, all of Mich.

[73] Assignee: Allied Chemical Corporation, New York, N.Y.

[22] Filed: July 10, 1974

[21] Appl. No.: 487,328

[52] U.S. Cl. .............................................. 242/107.4
[51] Int. Cl. ........................................... B65h 75/48
[58] Field of Search ..................... 242/107.4–107.6; 280/150 SB; 297/386–388; 200/52 A, 61.58 SB

[56] References Cited
UNITED STATES PATENTS

| | | | |
|---|---|---|---|
| 2,415,086 | 2/1947 | Detwiler | 200/52 |
| 3,226,053 | 12/1965 | Petty | 242/107.4 |
| 3,741,494 | 6/1973 | Fiala | 242/107.4 |
| 3,770,224 | 11/1973 | Hayashi et al. | 242/107.4 |

Primary Examiner—Leonard D. Christian
Attorney, Agent, or Firm—John P. Kirby, Jr.

[57] ABSTRACT

The vehicle-sensitive retractor has an improved, universal inertia mechanism and support assembly. The inertia mechanism is a sphere adapted to roll in an infinite variety of directions in an approximately horizontal plane. The support assembly includes a sphere support, a swivel axis for the sphere support, a trunnion and a swivel axis for the trunnion. The sphere rolls on the sphere support. The swivel axis for the sphere support is adapted to allow the sphere support to pivot in two directions. The swivel axis for the trunnion is also adapted to allow the trunnion to pivot in two directions. The swivel axis for the trunnion is disposed approximately perpendicular to the swivel axis for the sphere support. As a result, the sphere support is adapted to pivot in an infinite variety of lateral directions. The improved actuating means is disposed above the sphere and is adapted to respond to rolling of the sphere on the sphere support to actuate the reel locking mechanism. The retractor may be tilted for installation without having to redesign the inertia mechanism and support assembly.

5 Claims, 4 Drawing Figures

VEHICLE SENSITIVE RETRACTOR WITH IMPROVED UNIVERSAL INERTIA MECHANISM

BACKGROUND OF THE INVENTION

1. Field of the Invention

This invention relates to safety belt retractors for occupants of vehicles, such as automobiles. More particularly, this invention relates to an inertia responsive safety belt retractor which is vehicle-sensitive. Such a retractor is responsive to acceleration, deceleration or change in orientation of the vehicle, which may result from cornering, braking or overturning of the vehicle. In response thereto, the retractor locks to prevent further withdrawal of the safety belt. Still more particularly, this invention relates to an improved, universal inertia mechanism and support assembly which allows the retractor to be placed in a variety of positions within the vehicle.

2. Description of the Prior Art

Vehicle sensitive safety belt retractors have been recently developed which should significantly decrease the number of fatalities and serious injuries resulting from motor vehicle accidents. Most of these retractors use a vehicle sensitive mechanism having a pendulum assembly. Typically, such retractors also include a belt reel which is continually biased in a retracting direction and a pawl which is engagable with a ratchet wheel on the belt reel. When the pendulum assembly is displaced from its normally vertical position by acceleration, deceleration or change in orientation of the vehicle, the pendulum assembly moves the pawl into engagement with the ratchet wheel, preventing further withdrawal of the belt. United States patent application Ser. No. 312,534 filed Dec. 6, 1972 in the name of Lon E. Bell, now U.S. Pat. No. 3,838,831 discloses an example of such a retractor.

If a pendulum assembly is used, it is of prime importance for the pendulum assembly to be in a vertical position prior to actuation by acceleration, deceleration or change in orientation of the vehicle, so that the safety belt can be moved without locking the belt reel. Regardless of whether or not a pendulum assembly is used, it is desirable to have an improved, universal inertia mechanism and support which is adjustable and does not need to be redesigned for different vehicles. This is desirable because the retractor needs to be mounted in various positions and various orientations within different vehicles. Sometimes the retractor needs to be tilted, that is, turned partly on its side for installation.

SUMMARY OF THE INVENTION

The retractor of this invention is vehicle-sensitive and inertia-operated. The retractor has a support structure having two opposed, parallel side walls, a reel for winding the safety belt, means adapted to lock the reel and thereby restrain an occupant of the vehicle during emergency situations, an improved inertia mechanism, an improved support assembly mounted on the retractor for supporting the inertia mechanism and an improved actuating means responsive to the inertia mechanism for engaging and operating the means for locking the reel. The inertia mechanism is a sphere adapted to roll in an infinite variety of directions in an approximately horizontal plane. The support assembly includes a sphere support, a swivel axis for the sphere support, a trunnion, and a swivel axis for the trunnion. The sphere is adapted to roll on the sphere support. The swivel axis for the sphere support is adapted to allow the sphere support to pivot in two lateral directions. The trunnion is adapted to support the sphere support. The swivel axis for the trunnion is adapted to allow the trunnion to pivot in two lateral directions. The swivel axis for the trunnion is disposed approximately perpendicular to the swivel axis for the sphere support. The support assembly is thereby adapted to pivot in any lateral direction to an infinite variety of operable static positions to which the sphere support is adjustable according to the position in which the retractor is oriented by virtue of installation in the vehicle. The actuating means is disposed above the sphere and has a rest position and a locking position. In the locking position, the actuating means causes actuation of the reel locking means. The actuating means is thereby adapted to respond to the rolling of the sphere on the sphere support to actuate the reel locking means.

The actuating means is disposed above the sphere and is adapted to respond to rolling of the sphere on the sphere support to actuate the reel locking means. The retractor and the sphere support each have a longitudinal axis. The longitudinal axis of the sphere support is approximately perpendicular to the swivel axis for the sphere support. The static position of the sphere support is adjustable in an infinite variety of lateral directions from a static position wherein the longitudinal axis of the sphere support is disposed at an angle of approximately 0° to an angle of approximately 30° with reference to the longitudinal axis of the retractor.

Typically, the reel locking means includes one or more ratchet wheels and a pawl, although other reel locking means may also be used. The actuating means has an unlocked position and a locked position. The actuating means is disposed in the unlocked position when the support assembly is in any one of its infinite variety of operable static positions. The actuating means is moved to the locked position by the sphere rolling on the sphere support during emergency situations to engage the pawl in the ratchet wheels to lock the reel and prevent further unwinding of the belt from the reel.

The inertia mechanism and support assembly are universal and unique because they do not have to be redesigned for use in different vehicles in order to have the pendulum assembly disposed vertically for the purpose of allowing the retractor to remain unlocked in normal operation. If the retractor is turned partly on its side, that is, tilted for installation, the static position of the pendulum assembly is adjustable to such tilted installation of the retractor.

DETAILED DESCRIPTION

Figure 1:
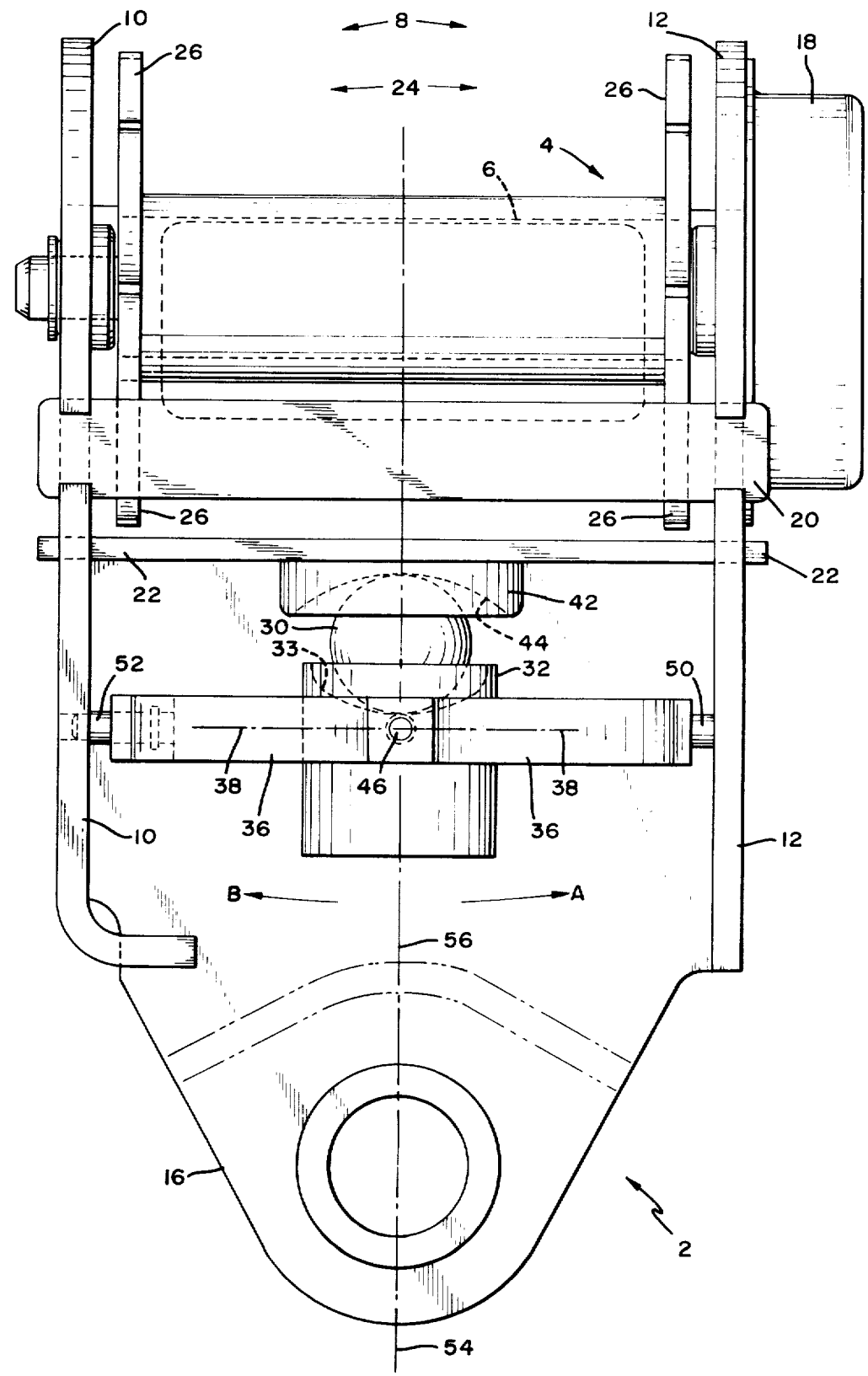
FIG. 1 is a front elevational view of the retractor of this invention having an inertia mechanism, support assembly and actuating means.
Figure 2:
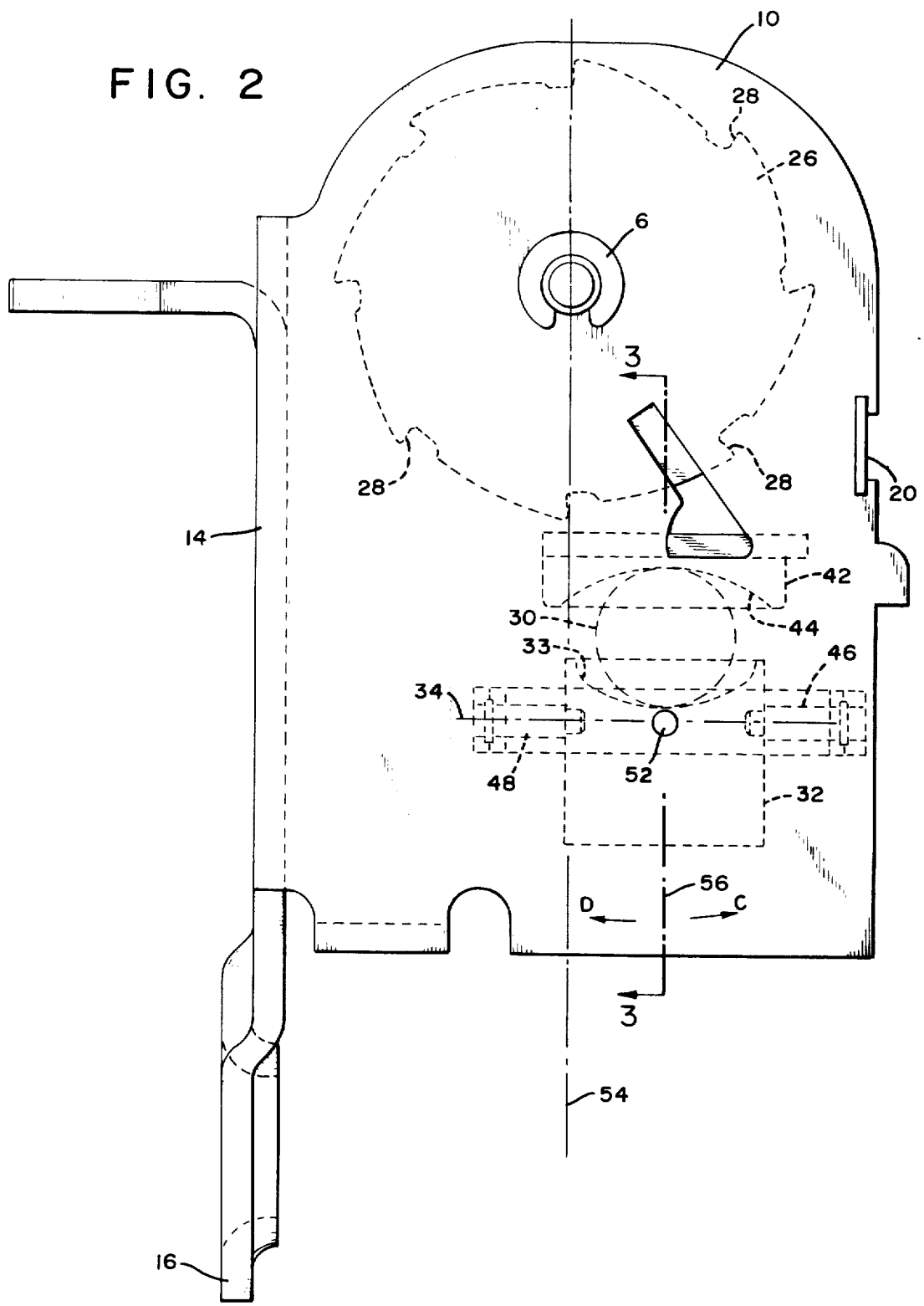
FIG. 2 is a side veiw of FIG. 1.
Figure 4:
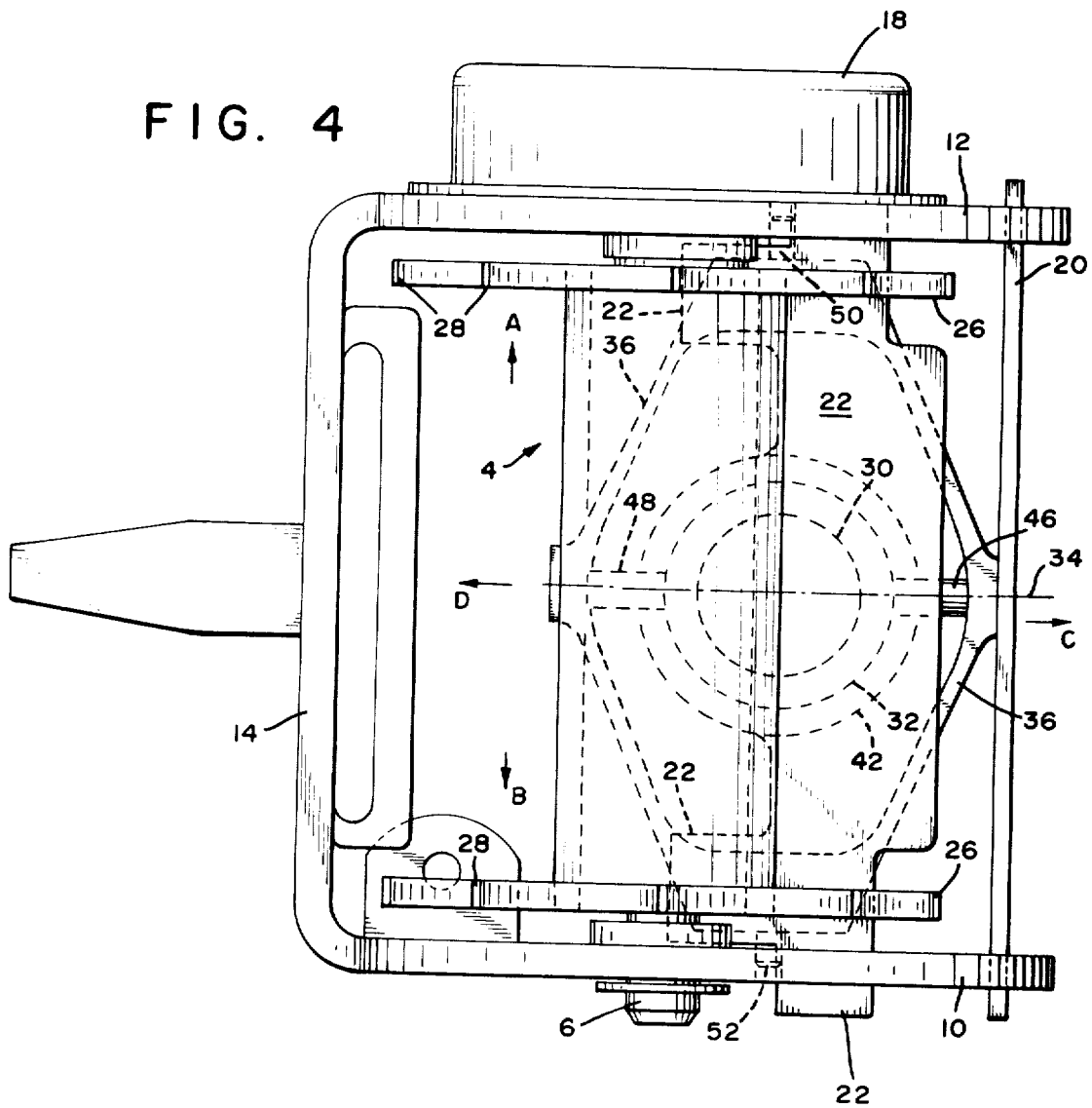
FIG. 4 is a top view of FIG. 2.

Referring to FIGS. 1, 2 and 4, the retractor, referred to generally by the numeral 2, has a reel means 4, including a reel shaft 6, rotatably mounted on a support means 8. The support means 8 is a load bearing member and includes two side walls 10 and 12 and a back wall 14. The support means 8 also includes a mounting means 16 in the form of a rigid extension adapted to be bolted or otherwise secured to an anchorage point in a vehicle (not shown).

A belt (not shown) is adapted to be attached to the reel shaft 6 for winding and unwinding thereon. The reel means 4 includes a biasing means, such as a tension return spring, inside a housing 18, which urges the reel shaft 6 to turn in a winding direction. The winding direction of the reel shaft 6 retracts the belt into the retractor 2. The opposite unwinding direction of the reel shaft 6 allows withdrawal of the belt from the retractor 2.

The two side walls 10 and 12 of the support structure 8 are disposed substantially parallel to one another and substantially perpendicular to the back wall 14. The support structure 8 also includes a cross member 20 extending between the side walls 10 and 12 and at the opposite side of the side walls 10 and 12 from the back wall 14.

The retractor 2 further includes a means for locking the reel means 4, such as a pawl 22 and a ratchet means 24. The ratchet means 24 includes at least one ratchet wheel 26 and, preferably, two ratchet wheels 26. The ratchet wheels 26 have ratchet teeth 28 (FIG. 2) on their outer circumferences and are fixedly mounted on the reel shaft.

The pawl 22 is pivotally mounted on the side walls 10 and 12 and extends between the side walls 10 and 12. The pawl 22 is adapted to pivot from an unlocked position, shown in FIG. 2 by dashed lines, to a locked position. In the locked position, the pawl 22 is pivoted into engagement with the ratchet wheels 26.

The retractor 2 further includes an inertia mechanism, a support assembly for the inertia mechanism and an actuating means, all of which are adapted to cooperate to actuate the locking means, such as pawl 22, from its unlocked position to its locked position during emergency situations. The inertia mechanism, support assembly and actuating means may be mounted inside the retractor, as illustrated in the drawings, or may be mounted outside the retractor on the outer side of one of the side walls 10 of the support structure 8. The inertia mechanism is a sphere 30 adapted to roll in an infinite variety of directions in an approximately horizontal plane.

The support assembly includes a sphere support 32, a swivel axis 34 (FIGS. 2 and 4) for the sphere support 32, a trunnion 36, and a swivel axis 38 (FIG. 1) for the trunnion 36. The sphere 30 is disposed on the sphere support 32 and the sphere 30 rolls on the concave upper surface 33 of the sphere support 32. The swivel axis 34 for the sphere support 32 is adapted to allow the sphere support 32 to pivot in two directions, the directions indicated by arrows A and B in FIGS. 1, 3 and 4.

The trunnion 36 is journaled in opposing side walls 10 and 12 of the support structure. The swivel axis 38 for the trunnion 36 is adapted to allow the trunnion 36 to pivot in two lateral directions, indicated by arrows C and D in FIGS. 2 and 4. The swivel axis 38 for the trunnion 36 is disposed approximately perpendicular to the swivel axis 34 for the sphere support 32. As a result, the support assembly 32 is thereby adapted to pivot in an infinite variety of lateral directions.

The actuating member 42 is disposed above the sphere 30 and has a rest position and a locking position. Preferably, the actuating member 42 has a concave lower surface 44 in contact with the sphere 30. In the locking position the actuating member 42 causes actuation of the reel locking means. The actuating member 42 is adapted to respond to the rolling of the sphere 30 on the sphere support 32 to actuate the reel locking means.

Preferably, the upper surface 33 of the sphere support 32 is concave or dished shaped, but it can be flat. The sphere 30 has a rest position and a locking position. In the rest position, the sphere 30 is disposed in the approximate center of the sphere support 32. The rest position of the sphere 30 corresponds to the rest position of the actuating member 42. In the locking position, the sphere 30 is disposed in the approximate outer periphery of the shpere support 32. The locking position of the sphere 30 corresponds to the locking position of the actuating member 42. When the sphere 30 rolls from its rest position to its locking position, the sphere 30 moves the actuating member 42 and causes actuation of the reel locking means. If the sphere 30, sphere support 32 and actuating member 42 are mounted on the outer side of one of the side walls 10 of the support structure 8, the pawl 22 must extend through such side wall 10 to be actuated by the actuating member 42 or the pawl and a ratchet wheel may be mounted on the outer side of the side wall.

The sphere support 32 further includes two swivel axles 46 and 48 (FIG. 4) disposed on opposing sides of the sphere support 32. The swivel axles 46 and 48 for the sphere support 32 are journaled in opposing sides of the trunnion 36. The swivel axles 46 and 48 for the sphere support 32 form the swivel axis 34 for the sphere support 32 upon which the sphere support 32 pivots in two lateral directions A and B with reference to the trunnion 36. The trunnion 36 further includes two swivel axles 50 and 52 disposed on opposing sides of the trunnion 36. The trunnion swivel axles 50 and 52 form the trunnion swivel axis 38 upon which the trunnion 36 pivots in two lateral directions C and D. The trunnion swivel axles 50 and 52 are each journaled in opposing sides of the retractor side walls 10 and 12. As a result, the sphere 30 is supported by the sphere support 32, which in turn, is supported by the trunnion 36, which in turn, is supported by the side walls 10 and 12.

The retractor 2 has a longitudinal axis 54 which is approximately parallel to the side walls 10 and 12 and the back wall 14. The sphere support 32 has a longitudinal axis 56 which is approximately perpendicular to the swivel axis 34 of the sphere support 32. The sphere support 32 is adjustable in any lateral direction from a static position wherein the longitudinal axis 56 of the sphere support 32 is disposed at an angle of approximately 0° to a static position wherein the longitudinal axis 56 of the sphere support 32 is disposed at an angle of approximately 30° with reference to the longitudinal axis 54 of the retractor 2, or any angle between 0° and approximately 30°.

Figure 3:
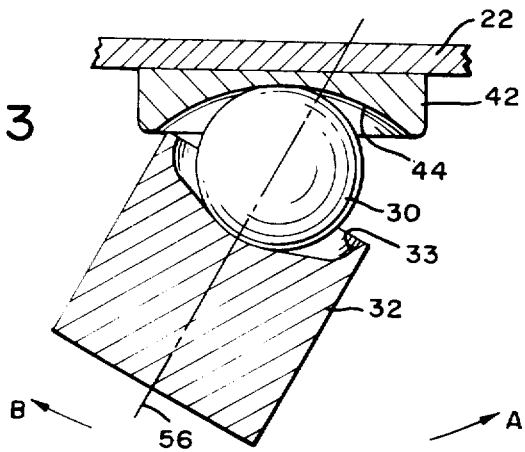
FIG. 3 is a partial cross-sectional view of FIG. 2 along the lines 3—3, showing the sphere and sphere support.

Thus, the support assembly is adapted to pivot in any lateral direction to an infinite variety of operable static positions to which the support assembly is adjustable according to the position in which the retractor 2 is oriented by virtue of installation in the vehicle. In all of the infinite variety of operable static positions to which the sphere support 32 is adjustable, the longitudinal axis 56 of the sphere support 32 adjusts to a position approximately parallel to the vertical plane. It is the longitudinal axis 54 of the retractor 2 that assumes an angle with reference to the vertical plane. This adjustment of the sphere support 32 takes place by means of the upper surface 33 of the sphere support 32 adjusting in any direction with reference to the sphere 30, without moving the pawl actuating member 42 from its unlocked position. During normal operation of the retractor 2, when the vehicle is not in a dangerous situation, the sphere 30 continues to rest on the sphere support 32, the sphere support 32 being in any one of its infinite variety of operable static positions. During normal operation of the retractor 2, when the vehicle is not in a dangerous situation, the pawl actuating member 42 rests in its unlocked position on top of the sphere 30. The actuating member 42 is connected to the underside of the pawl 22 and the pawl 22 remains in its unlocked position. FIG. 3 shows the sphere support 32 in its extreme static position.

When the acceleration, deceleration or change in orientation of the vehicle exceeds a predetermined magnitude, the sphere 30 rolls near the outer periphery of the sphere support 32. Such movement of the sphere 30 lifts the actuating member 42, which in turn lifts the pawl 22, causing the pawl 22 to pivot into engagement with the ratchet wheels 26. The sphere 30 and sphere support 32 provide a simple, but effective, vehicle-sensitive, inertia-operated mechanism adapted to lock the retractor 2 and thereby restrain an occupant of the vehicle during emergency situations. As a result, when the vehicle is subjected to sudden braking, cornering or overturning, for example, the sphere 30 and sphere support 32 lock the ratchet wheels 26 and prevent the belt from being withdrawn any further from the retractor 2, thereby restraining the occupant of the vehicle wearing the safety belt. The sphere 30 and sphere support member 32 are highly reliable in operation and inexpensive to manufacture. This arrangement provides reduced maintenance because of less likelihood for entrapment of dirt particles. A typical location for this retractor is on the back of a seat where the angle or orientation of the retractor changes with the position of the seat.

We claim:

1. In a vehicle-sensitive, inertia-operated safety belt retractor having a support structure having two opposed, parallel side walls, a reel for winding the safety belt, means adapted to lock the reel and thereby restrain an occupant of the vehicle during emergency situations, an inertia mechanism, a support assembly mounted on said retractor for supporting the inertia mechanism, and an actuating means responsive to said inertia mechanism for operating the means for locking the reel; the improvement wherein:

the inertia mechanism is a sphere in contact with said actuating means and adapted to roll in an infinite variety of directions in an approximately horizontal plane;

said support assembly includes a sphere support upon which said sphere rolls; a swivel axis for said sphere support adapted to allow said sphere support to pivot in two lateral directions; a trunnion for supporting said sphere support, a swivel axis for said trunnion adapted to allow said trunnion to pivot in two lateral directions, said swivel axis for said trunnion being disposed approximately perpendicular to said swivel axis for said sphere support, said support assembly thereby being adapted to pivot in any lateral direction to an infinite variety of operable static positions to which said support assembly is adjustable according to the position in which the retractor is oriented by virtue of installation in the vehicle; and said actuating means is disposed above said sphere and has a rest position and a locking position, wherein in said locking position said actuating means causes actuation of said reel locking means, said actuating means thereby being adapted to respond to the rolling of said sphere on said sphere support to actuate said reel locking means.

2. The vehicle-sensitive, inertia-operated safety belt retractor according to claim 1 wherein:

said sphere has a rest position, wherein said sphere is disposed in the approximate center of said sphere support, said rest position corresponding to said rest position of said actuating member; and a locking position wherein said sphere is disposed near the approximate outer periphery of said sphere support, said locking position of said sphere corresponding to the locking position of said actuating member; whereby when said sphere rolls from said rest position to said locking position, said sphere moves said actuating member and causes actuation of said reel locking means.

3. The vehicle-sensitive, inertia-operated safety belt retractor according to claim 1 wherein:

said sphere support further comprises two swivel axles disposed on opposing sides of said sphere support, said swivel axles for said sphere support being journaled in opposing sides of said trunnion, said swivel axles forming said swivel axis for said sphere support upon which said sphere support pivots in two lateral directions with reference to said trunnion; and said trunnion further comprises two swivel axles disposed on opposing sides of said trunnion, said trunnion swivel axles forming said trunnion swivel axis upon which said trunnion pivots in two lateral directions.

4. The vehicle-sensitive, inertia-operated safety belt retractor according to claim 1 wherein:

said retractor further includes a support structure including two opposing parallel side walls and a back wall, said side wall being disposed approximately perpendicular to said back wall; and said trunnion is journaled in opposing side walls.

5. The vehicle-sensitive, inertia-operated safety belt retractor according to claim 1 wherein:

said retractor has a longitudinal axis; said sphere support has a longitudinal axis; and said sphere support is adjustable in any direction from a static position wherein said longitudinal axis of said sphere support is disposed at an angle of approximately 0° to an angle of approximately 30° with reference to the longitudinal axis of said retractor.

* * * * *